Patented Jan. 10, 1933

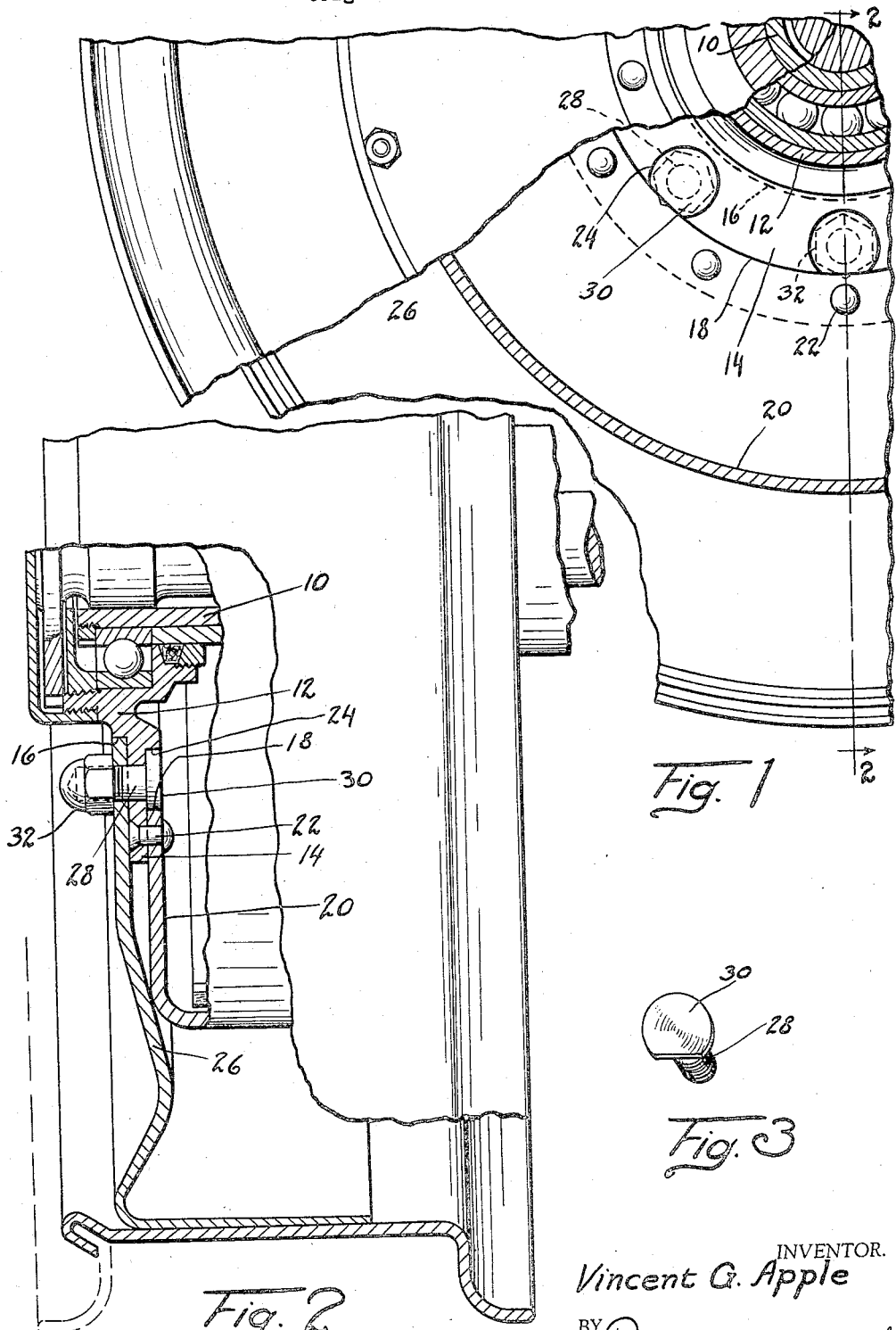

1,893,834

UNITED STATES PATENT OFFICE

VINCENT G. APPLE, OF DAYTON, OHIO, ASSIGNOR TO BENDIX BRAKE COMPANY, OF SOUTH BEND, INDIANA, A CORPORATION OF ILLINOIS

VEHICLE WHEEL

Original application filed November 2, 1929, Serial No. 404,235. Divided and this application filed February 13, 1931. Serial No. 516,638.

My invention relates to vehicle wheels, having particular reference to an improved disc wheel and drum assembly, and constitutes a division of my copending application Serial No. 404,235, filed November 2, 1929.

An object is to facilitate the rapid assembly and disassembly of a wheel disc associated with a wheel hub and brake drum.

More particularly the object of the invention is to provide means whereby the bolt which secures the outer wheel disc to the rest of the assembly is prevented from rotating as the nut thereof is rotated.

Various other meritorius features will be found in the particular combination and arrangement of parts utilized, these being clearly illustrated in the accompanying drawing wherein like numerals refer to like parts throughout the several figures and wherein:

Fig. 1 is a sectional elevation, partly broken away for the sake of clearness, of my improved assembly, Fig. 2 is a section along 2—2 of Fig. 1, and Fig. 3 is a detail.

As indicated in Fig. 2 the assembly is utilized with axle housing 10 on which is rotatably mounted the wheel hub 12 which functions as a bearing housing for the assembly. The wheel hub is provided with a radially extending flange 14, which flange includes an annular shoulder 16 around its outer face and a second annular shoulder 18 around its inner face. The inner annular shoulder 18 constitutes means for centering the brake drum 20, which drum is secured to the outer portion of flange 14 as by means of the spaced apart rivets 22.

The inside face of the flange 14 is countersunk at spaced intervals around its circumference in such a way that the countersink includes the radially outer edge of the shoulder 18. The said flange is likewise apertured centrally with relation to said countersink to receive the bolt 28 and it will therefore be apparent that the D-shaped head 30 of said bolt seats within the D-shaped pocket formed by the countersink and the innermost edge of the brake drum 20.

The assembly is now ready for the wheel disc 26, which is secured to the flange 14 by means of a bolt 28 having a substantially D-shaped head 30 which is adapted to drop into the pocket 24 formed by the countersink and the inner periphery of drum 20. The head 30 of the bolt being positioned in the countersink or pocket, it is impossible for the bolt to rotate when the nut 32 is screwed on. Obviously it will be equally impossible for the said bolt to rotate during the removal of nut 32.

Inasmuch as the wheel disc must necessarily be removed relatively frequently by unskilled manipulators, it will be seen that a rapid, sure means for securing the said disc firmly in position will be extremely advantageous. All danger of accident by virtue of a faulty positioning of the wheel disc, by reason of having thought the nut to be screwed on as tightly as possible when in reality the bolt was simply rotating with the nut, is eliminated.

Various modifications of the invention concept disclosed herein will be apparent to those skilled in the art and for that reason I intend to limit myself only within the scope of the appended claims.

What I claim:

1. A wheel hub having a radial flange provided with annular shoulders on its outer and inner faces and having a hole therethrough, the inner face of said flange being provided with a counterbore concentric with said hole extending through the inner shoulder and including the edge thereof.

2. A disc wheel assembly comprising a hub having a radial flange, and annular shoulder extending about the inner and the outer faces of said flange, a brake drum centered upon said inner shoulder and secured to the flange, said flange being provided with a hole extending through said flange and provided with a counter bore extending through the inner shoulder flush with the inner surface of the flange outwardly of said shoulder whereby a non-circular pocket is defined by the counterbore in said shoulder and the brake drum, a bolt provided with a head corresponding substantially to the shape of said pocket seated in said pocket, and a wheel disc supported on said outer shoulder and positioned by said bolt.

3. A disc wheel assembly comprising a hub having a radial flange provided with an annular shoulder upon its inner and its outer faces, and a hole extending therethrough having a countersink through said inner shoulder including the edge thereof and extending to a point flush with the inner surface of the flange outwardly of said shoulder, and a brake drum centered by said inner shoulder and secured to the flange.

4. A wheel and brake drum assembly comprising a wheel hub having a radially extending flange, a brake drum secured to the inner face of said flange, said flange being provided with a countersink in the inner face of the flange adjacent the edge of the drum, and a wheel secured to the outer face of said flange by means of a bolt having a polygonal head, said bolthead resting in the countersink with an edge adjacent the edge of the drum.

In testimony whereof, I, VINCENT G. APPLE, sign this specification.

VINCENT G. APPLE.